(12) United States Patent
Jackson, Jr.

(10) Patent No.: US 6,429,933 B1
(45) Date of Patent: Aug. 6, 2002

(54) METHOD OF IMAGE PROCESSING FOR OFF THE GLASS RAIN SENSING

(75) Inventor: James A. Jackson, Jr., Kettering, OH (US)

(73) Assignee: Valeo Electrical Systems, Inc., Auburn Hills, MI (US)

(*) Notice: Subject to any disclaimer, the term of this patent is extended or adjusted under 35 U.S.C. 154(b) by 0 days.

(21) Appl. No.: 09/267,867

(22) Filed: Mar. 12, 1999

(51) Int. Cl.[7] ............................................... G01N 21/00
(52) U.S. Cl. ............................... 356/239.8; 15/DIG. 15
(58) Field of Search ........................... 356/239.8, 238.3, 356/239.1, 239.2, 237.2, 237.3, 237.4, 237.5, 237.6, 239.7, 445; 250/208.1, 573, 227.25, 574; 318/483, DIG. 2, 480; 15/DIG. 15; 340/602

(56) References Cited

U.S. PATENT DOCUMENTS 5,923,027 A * 7/1999 Stam et al. ............... 250/208.1
6,020,704 A * 2/2000 Buschur ................... 15/250.12
6,144,022 A * 11/2000 Tenenbaum et al. .... 15/DIG. 15

* cited by examiner

Primary Examiner—Frank G. Font
Assistant Examiner—Tu T. Nguyen
(74) Attorney, Agent, or Firm—Howard & Howard

(57) ABSTRACT

An assembly (10) for sensing moisture (20) on the exterior surface (22) of a windshield (14) from a position spaced from the interior surface (18) of the windshield (14). The assembly (10) includes a focal plane detector (12) comprising a plurality of pixels (24) adapted for disposition in spaced relationship to the interior surface (18) of the sheet of glass (14). An imaging lens (16) is adapted for disposition between the focal plane detector (12) and the interior surface (18) of the sheet of glass (14) for directing light waves from moisture (20) on the exterior surface (22) of the sheet of glass (14) through the imaging lens (16) to produce successive images of the moisture (20) on the focal plane detector (12).

16 Claims, 4 Drawing Sheets

METHOD OF IMAGE PROCESSING FOR OFF THE GLASS RAIN SENSING

RELATED APPLICATION

This application is an improvement to the invention disclosed in co-pending application Ser. No. 09/262,411 filed Mar. 04,1999 now U.S. Pat. No. 6,207,967 and assigned to the assignee of the subject invention.

BACKGROUND OF THE INVENTION

1. Field of the Invention

The subject invention relates to an assembly for sensing moisture on a sheet of glass and, more particularly, to a rain sensor for detecting rain on the windshield of an automotive vehicle to turn on the wipers.

2. Description of the Prior Art

As noted in the abovementioned co-pending application, a focal plane array of photosensors configured as CCD, CMOS or other means, is capable of detecting rain or other forms of moisture on a vehicle windshield. In general, a lens or reflective optical element is used to form a real image, in the optical sense, of the objects on the focal plane array, and that array is then read by addressing each image element or pixel of the array sequentially. The analog output level of each pixel is a function of the integrated light exposure of that image element, and is normally converted into a digital value which is stored in a memory buffer. The aggregate of such sequentially addressed and stored digital pixels constitutes an image frame, which may consist of only a few thousand pixels or over a million pixels in high resolution imagers.

In many imaging applications, such as in conventional television, the stored digital data that forms the image frame is simply read out and is used to create an analog image on a display screen. Other uses for such digitally stored images include metrology and/or machine vision applications where the digitally stored image frame is subjected to image analysis. The present invention describes a method whereby stored image frames are analyzed digitally with certain algorithms, in order to recognize the presence of specific characteristic images. Such images might include water drops, rivulets, mist, or even dirt.

SUMMARY OF THE INVENTION AND ADVANTAGES

A method for sensing moisture on the exterior surface of a sheet of glass comprising the steps of positioning an imaging lens in spaced relationship to the interior surface of the sheet of glass, passing light waves from moisture on the exterior surface of the sheet of glass through the imaging lens and producing first and second successive images of the moisture on the glass, and successively directing the first and second images from the lens onto a focal plane detector. The method is characterized by storing the first image, storing the second image, comparing the first and second images, and providing a control signal in response to predetermined differences between the first and second images.

The assembly to perform the method includes a focal plane detector adapted for disposition in adjacent to the interior surface of the sheet of glass, and an imaging lens adapted for disposition between the focal plane detector and the interior surface of the sheet of glass for directing light waves from moisture on the exterior surface of the sheet of glass through the imaging lens to produce successive first and second images of the moisture on the focal plane detector. The assembly is characterized by a controller for storing the first image and for storing the second image and for comparing the first and second images, and for providing a control signal in response to predetermined differences between the first and second images.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
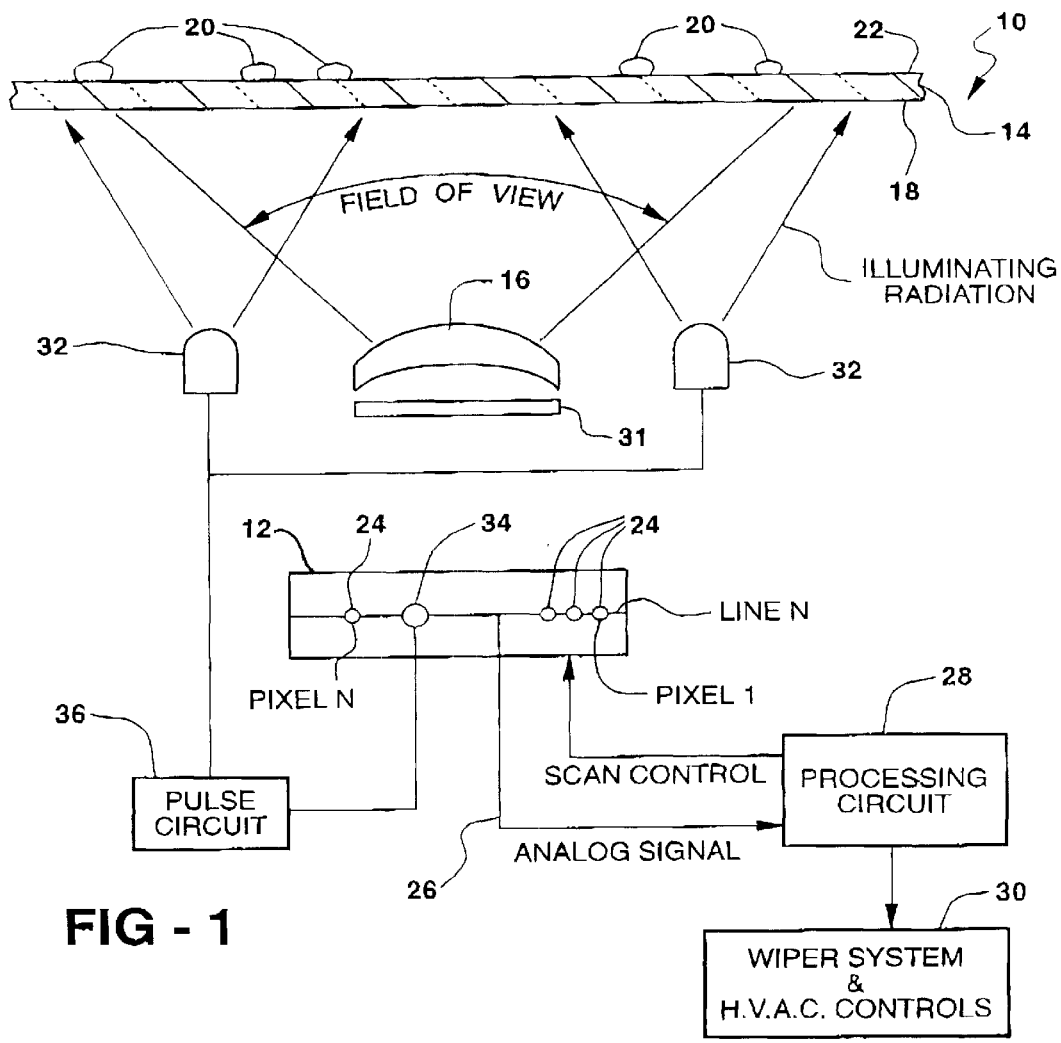
FIG. 1 is a schematic view of an implementation of the subject invention.

Referring to the Figures, wherein like numerals indicate like or corresponding parts throughout the several views, an assembly for sensing moisture on a glass surface from a position spaced from the glass is generally shown at 10 in FIG. 1. The assembly 10 includes, inter alia, a focal plane detector 12 adapted for disposition in spaced relationship to the interior surface 18 of a sheet of glass 14. The sheet of glass 14 is the windshield of an automotive vehicle. An imaging lens 16 is adapted for disposition between the focal plane detector 12 and the interior surface 18 of the sheet of glass 14 for directing light waves from moisture 20 on the exterior surface 22 of the sheet of glass 14 through the imaging lens 16 to produce successive first and second images of the moisture 20 on the focal plane detector 12.

The focal plane detector 12 comprises a plurality of pixels 24 for dividing the images into a plurality of elements and for producing an analog signal 26 corresponding to each of the elements.

An image control and detection processing circuit 28 is included for establishing a reference image level of the analog signals 26 representing a non-moisture 20 condition of the exterior surface 22 of the glass 14 and for scanning the analog signals 26 to produce a wiper signal to the wiper system and the heater/vent & airconditioning controller 30 in response to a deviation from the reference image level. The non-moisture condition may, of course, be a condition where an minimal amount or an acceptable amount of moisture remains on the windshield. The wiper signal is a generic signal supplied to the wiper control and defrost or defog interface circuit 30 which, in turn, sends a signal to the wiper drive system and/or the heater, vent and air conditioning controls. In addition, the processing circuit 28 changes the reference image level in response to permanent changes in the non-moisture 20 condition of the exterior surface 22 of the glass 14. For example, the glass may become permanently scratched and after repeated indications of the new scratched condition the processing circuit 28 changes the threshold, reference image or steady-state level.

Ambient light can be used to illuminate the water droplets by transmissive means. Naturally ambient light can only be used in the daytime, and other provisions for fighting the water droplets on the windshield would be used at night. Low cost light emitting diodes (LEDs) operating at 880 nm (nanometers) or even 940 nm can be used singly or in an array to effectively illuminate the desired area of the windshield. The preferred assembly, therefore, includes a light source 32 adapted for disposition in spaced relationship to the interior surface 18 of the sheet of glass 14 for directing light to the exterior surface 22 of the glass 14 whereby light waves generated by the light source 32 are directed from moisture 20 on the exterior surface 22 of the sheet of glass 14 through the imaging lens 16 to produce the real image of the moisture 20 on the focal plane detector 12. In the preferred embodiment, the light source 32 comprises one or more light emitting diodes (LED). in addition, there is included an ambient light sensor 34 for sensing a predetermined level of ambient light for illuminating the LEDs 32 in response to the ambient light being below the predetermined level. The light sensor 34 includes a pulse circuit 36 for pulsing the light emitting diodes 32. Naturally, a narrow band filter 31 could be used to allow only the illuminating wavelengths to pass through to the detector 12, greatly improving the signal to noise ratio of the system. Pulsed LEDs operating at frequencies ranging from tens of Hz to kHz may be used to improve discrimination of the illumination signal from ambient light.

Figure 2:
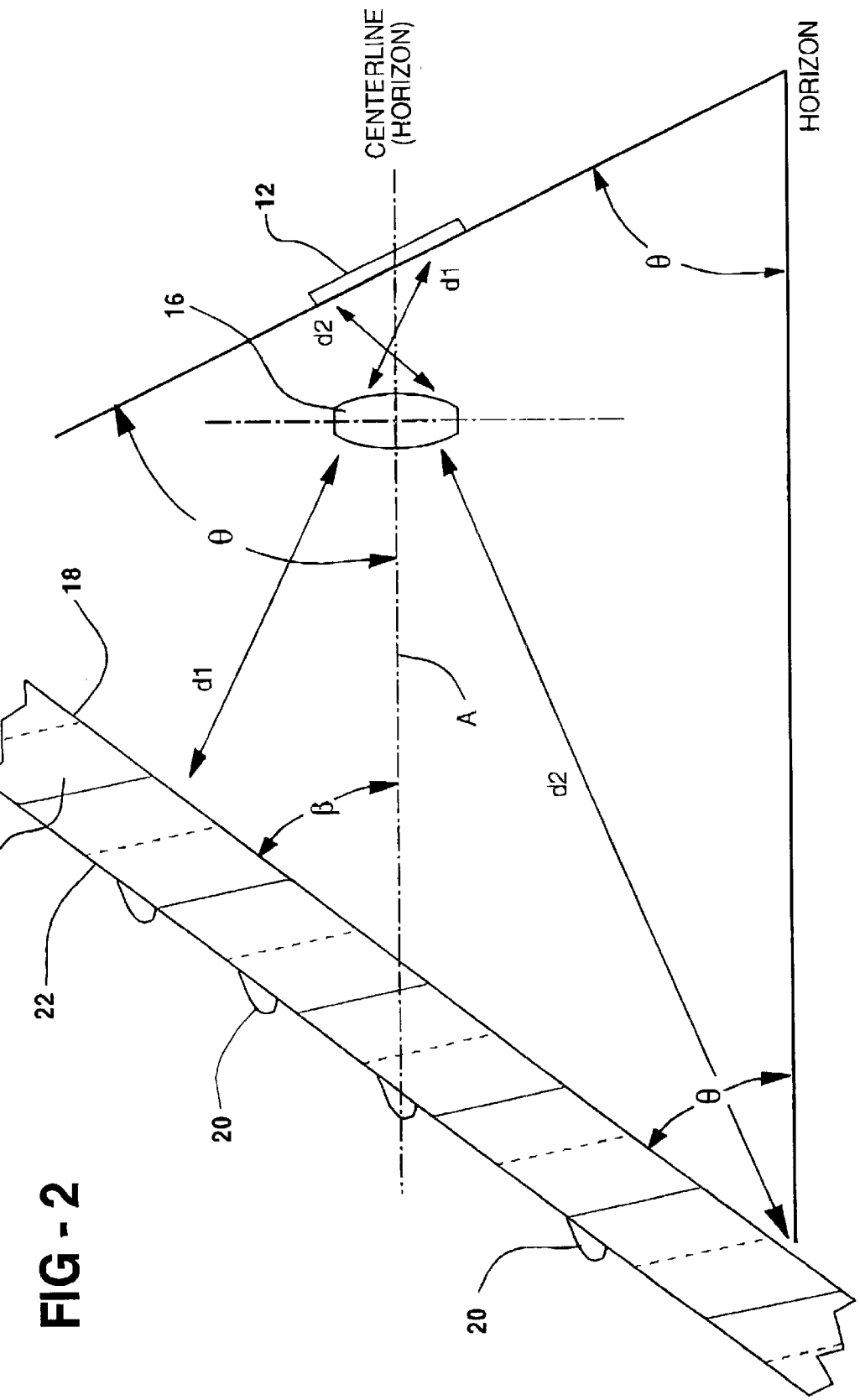
FIG. 2 is a schematic view of a an implementation of the subject invention.

Normally, the lens 16, the focal plane detector 12 and the LEDs would be mounted on the forward side, i.e., windshield facing side, of the rearview mirror in all automobile. In so mounting, the lens 16 may be disposed at an acute angle Θ relative to the focal plane detector 12 for varying the magnification of the real image from one pixel 24 to another pixel 24. As illustrated in FIG. 2, the optical axis a of the lens 16 is positioned at an acute angle Θ relative to the plane of the focal plane detector 12 whereby the lens 16 may also be positioned at acute angle β relative to the sheet of glass 14 to correct the image toward remaining in focus throughout the object field at the focal plane detector 12. Although, the image may not be perfectly in focus, the distortion caused by the slant angle β will be compensated for by the acute angle Θ relationship between the lens 16 and the plane of the detector 12.

Figure 3:
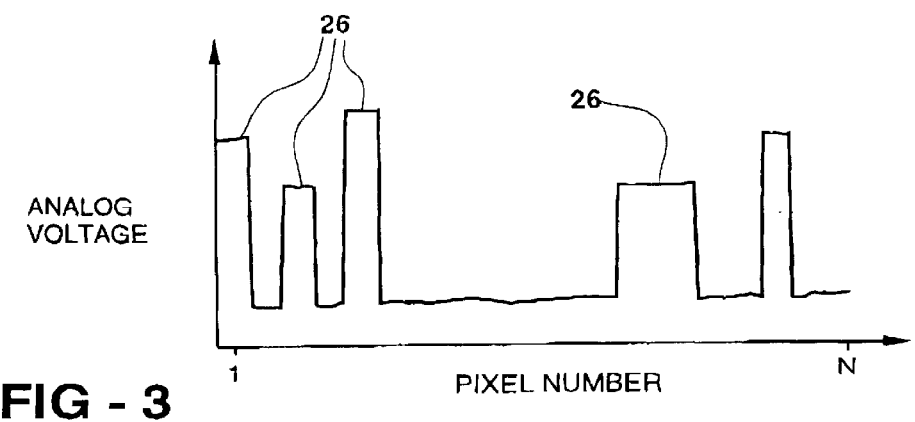
FIG. 3 is a graph of the analog signal produced by subject invention.

FIG. 3 shows the analog voltage on the X or vertical axis and number of pixels on the Y or horizontal axis and the peak positions in the graph represent the moisture drops effect upon the light waves. The recovered signal, whether from a single line photosensor array 12, such as a CCD or MOS sensor, or from a two dimensional imaging array of similar construction, will contain analog information relating to the reflection by individual drops of the illumination source. That is, individual pixel or image elements 24 in the photo detector array 12 will contain analog information corresponding to the brightness of certain parts of the image, which will be the retro-reflecting drops 20 attached to the glass surface 22.

Figure 4:
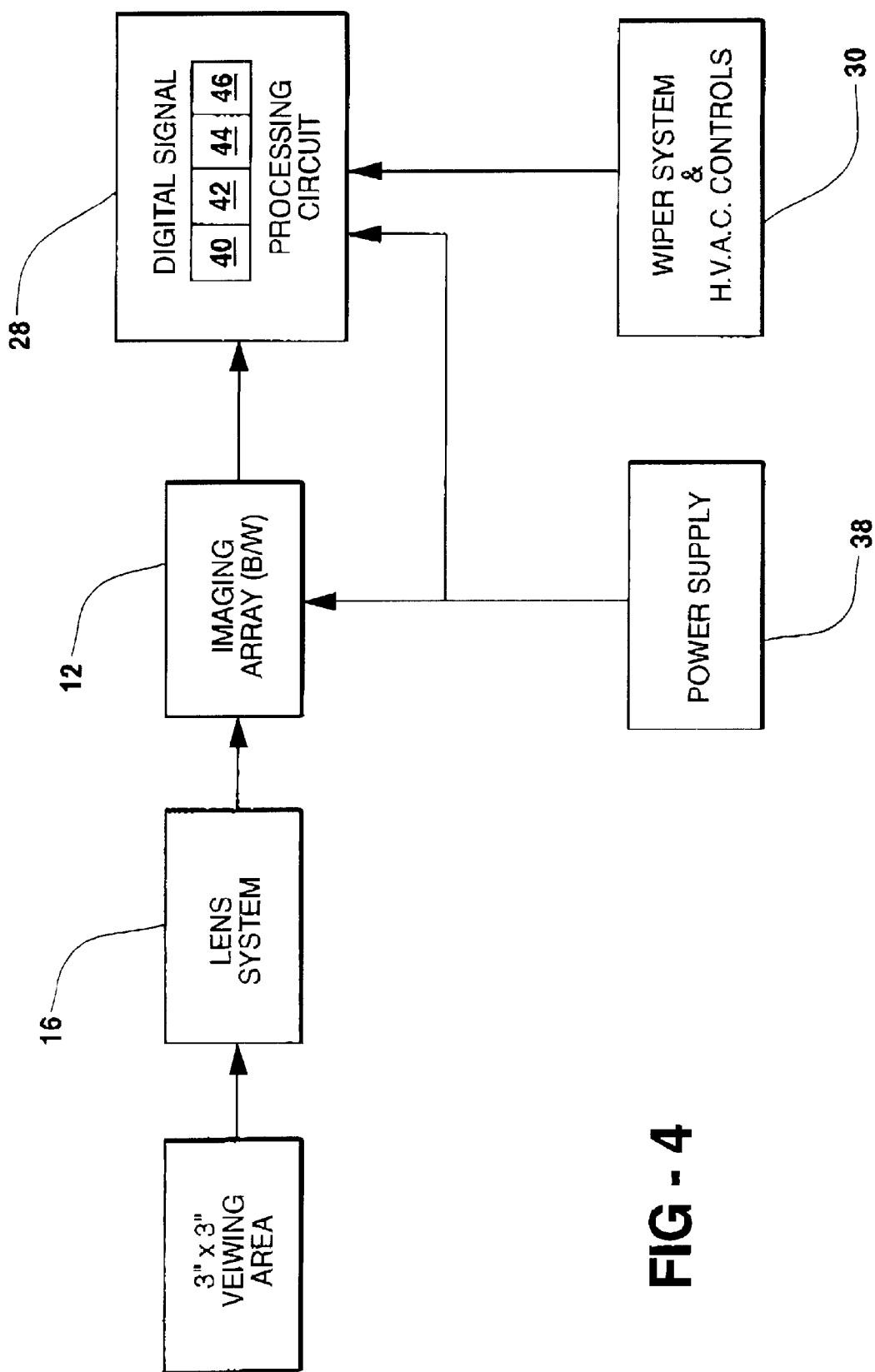
FIG. 4 is a block diagram of the components of the subject invention.

The assembly is characterized by a processing circuit or controller 28, which comprises any suitable combination of hardware and software, for storing the first image and for storing the second image and for comparing the first and second images, and for providing a control signal 30 in response to predetermined differences between the first and second images. Referring to FIG. 4, a typical viewing area of approximately nine square inches (50,000 mm square) is projected by the lens 16 onto a solid state local plane array 12. The processing circuit may include a image storage buffer or frame memory to receive the signal from the array 12, which may be a monochrome CCD or CMOS imager. In one preferred embodiment of the invention, a sixteen bit, fixed point digital signal processor (D.S.P.) acts as the system controller 28 and directly interfaces with the imager 12 and frame storage buffer. The D.S.P. 28 functions as a very high speed dedicated microprocessor that implements the image analysis algorithm. Depending upon the specific functions that are desired, the D.S.P. 28 may be interfaced with the vehicular wiper sub-system 30 and/or the vehicular body computer which may, in turn, control the wiper system and the heating, ventilating and air conditioning (H.V.A.C.) system. Naturally, the assembly would include a power supply 38.

The controller 28 includes an edge detector 40 for detecting the edges in the first and second images and algebraically summing the areas of the first and second images. The edge detector 40 will fill in the edges along portions which are not clear to provide a finite periphery. The controller 28 also includes a mass detector 42 for determining the centers of mass of the second image. In addition, the controller 28 includes an adjustor 44 for adjusting the contrast and brightness of the first and second images prior to detecting the edges.

To account for permanent changes in the condition of the windshield which are not related to moisture, the controller 28 includes a storage parcel 46 for establishing a reference image level of the analog signals 26 representing a non-moisture 20 condition of the exterior surface 22 of the glass 14, for scanning the analog signals 26, for producing a wiper signal 30 in response to a deviation from the reference image level, and for changing the reference image level in response to permanent changes in the non-moisture 20 condition of the exterior surface 22 of the glass 14.

As the individual pixels 24 in the given line of photo detectors 24 are addressed, the relative analog level for each pixel 24 is examined as shown in the analog level graph of FIG. 3. Scanning is accomplished by either external timing means or by self scanning of the imager using onboard facilities, i.e. the vehicle computer or microprocessor. A microprocessor would be used to analyze the resulting signal stream alter it has been digitized. General purpose image analysis software or specific programs designed for rain sensing may be used to extract the most meaningful or useful information acquired from the photo sensing array 12. For example, ambient lighting conditions can be essentially disregarded and only the differential signals relating to individual droplet reflections need to be considered. Also, certain reflection parameters can be used to characterize the nature of the material that has collected on the windshield, such as raindrops, ice, mist or fog on the inside 18 of the windshield 14.

Image analysis methods are applied to the digital image frame stored in memory in order to properly recognize water drops, and the like, and to actuate the wiper system 30 when the predetermined combination of drop size and density (mass) has been reached. In other words, using the human factors data, it has been determined that optimal wiping of vehicular windshields is a function of water droplet size and distribution. A reasonable approximation of this ideal wiper response is attained when a certain water coverage area is achieved regardless of drop size. To that end, the image analysis algorithm employed in the present invention is primarily driven by the percentage of water droplet coverage in the representative viewing area.

Figure 5:
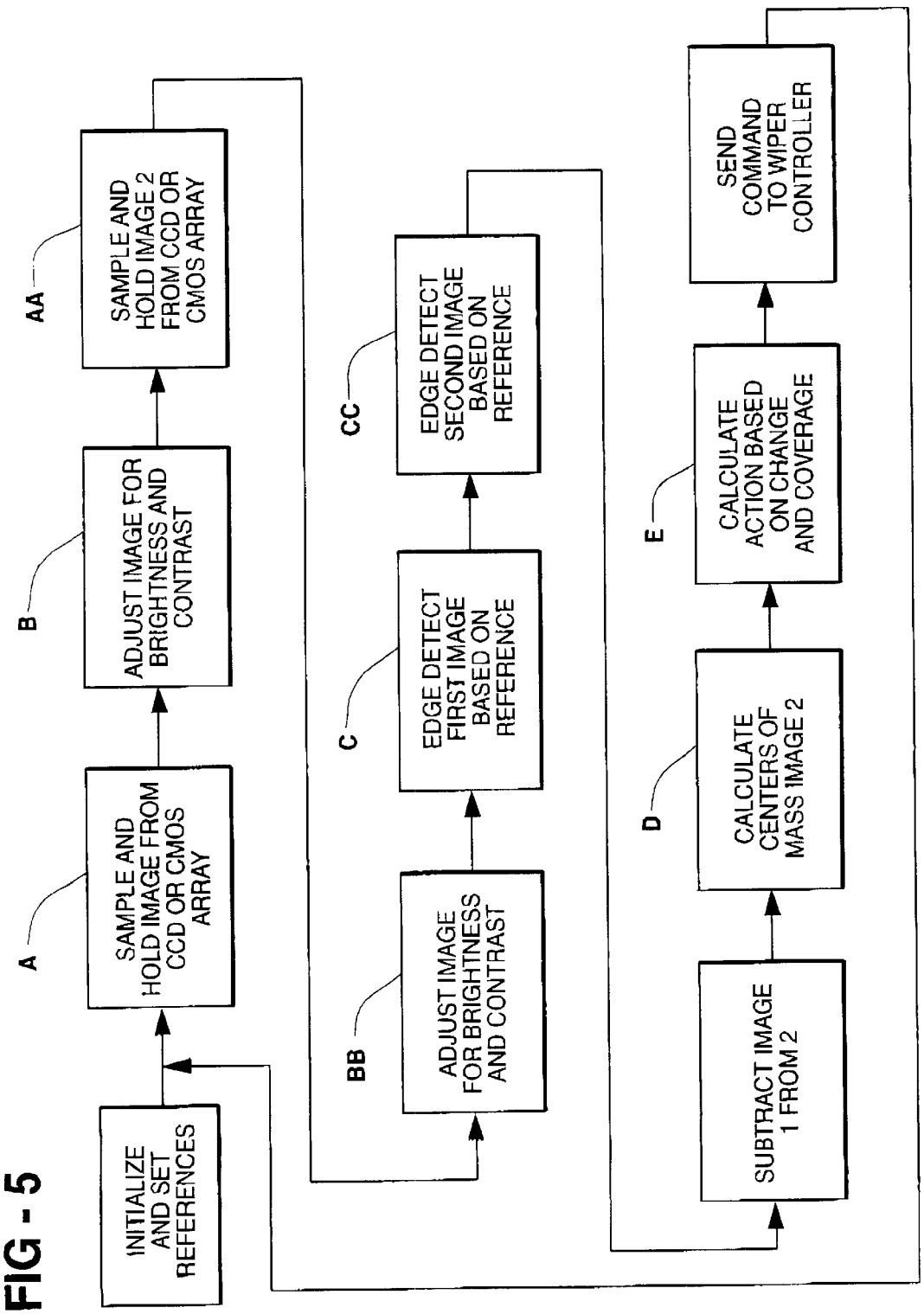
FIG. 5 is a block diagram of the steps of the subject invention.

Typically, steps involved in image analysis would involve the steps of: edge detection, contrast enhancement, area completion, area measurement, and area coverage. A controller 28 to perform these steps in the analysis of the 'rain image' is illustrated in FIG. 5, to provide an optimal, fully automated wiping function. As noted, the D.S.P. 28 would initialize and establish a set of references, e.g., after each wipe cycle. A first image would be stored (A) and second image would be stored (AA), each optionally adjusted for brightness and contrast (B) and (BB). Edge detection would be applied to the first (C) and second (CC) stored images, based on a predetermined reference or contrast value. The first image would be subtracted from the second image (the algebraic inverse being also possible) and the centers of mass would be calculated (D). The coverage area would be calculated and an action (output) would also be calculated based upon image frame changes and coverage area (E). The output signal 30 would send an appropriate command to the wiper controller and/or the HVAC system controller. As described, the system would be relatively immune to non rain artifacts because the first frame constitutes a reference image.

Certain imager arrays have on-board provisions for brightness and contrast control that might obviate the need for external [DSP] closed loop control of those parameters. Also, the DSP 28 may advantageously be used to determine when the auxiliary light source 32 should be activated, in order to derive the optimal signal to noise ratio (contrast) in the image field.

Interfacing the DSP system controller 28 to the vehicular body computer and/or HVAC system would permit the off the glass rain sensor to perform a second function: fog detection. The unique optical characteristics of fog on the inside surface 18 of the windshield would permit the imaging array 12 to sense interior fog as a unique image, with little contrast, but with high diffuse reflectivity. Establishing a set of specific templates to produce specific outputs is well within the capability of the DSP 28, and such enhancements of the basic 'rain sensing' function of the system have important commercial value.

No special provisions need be employed in the image analysis algorithm to deal with the moving wiper blade, because the contact area of the wiper blade is a line that should not appear as a 'closed area' in the image. However, the system controller 28 DSP 'knows' where the wiper blade is at all times, and could establish a video blanking interval consistent with an interfering blade position. Special double blade wipers could require such synchronization to reduce the deleterious effect of an undesirable added image artifact. Also note that if the characteristics of the desired image components are very predictable, and non rain artifacts are few, then a single frame storage and analysis system may be employed, thereby reducing system complexity and cost.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for sensing moisture (20) on the exterior surface (22) of a sheet of glass (14) comprising the steps of;

positioning an imaging lens (16) adjacent to the interior surface (18) of the sheet of glass (14), passing light waves from moisture (20) on the exterior surface (22) of the sheet of glass (14) through the imaging lens (16) and producing first and second successive images of the moisture (20) on the glass (14), and successively directing the first and second images from the lens (16) onto a focal plane detector (12), dividing the first image into a plurality of elements (24) and producing an analog signal (26) corresponding to each of the elements, dividing the second image into the plurality of elements (24) and producing an analog signal (26) corresponding to each of the elements, storing the signals (26) from the elements (24) for the first image, storing the signals (26) from the elements (24) for the second image, comparing the signal from each element for the first image to the signal from that element for the second image, and providing a control signal (30) in response to predetermined differences between the signals (26) from the elements (24) for the first and second images.

2. A method as set forth in claim 1 including detecting the edges in the first and second images.

3. A method as set forth in claim 2 including algebraically summing the areas of the first and second images.

4. A method as set forth in claim 3 including determining the centers of mass of the second image.

5. A method as set forth in claim 4 including adjusting the contrast and brightness of the first and second images prior to detecting the edges.

6. An assembly as set forth in claim 1 including a light source (32) adapted for disposition in spaced relationship to the interior surface (18) of the sheet of glass (14) for directing light to the exterior surface (22) of the glass (14) whereby light waves generated by the light source (32) are directed from moisture (20) on the exterior surface (22) of the sheet of glass (14) through said imaging lens (16) to produce the first and second images of the moisture (20) on said focal plane detector (12).

7. A method as set forth in claim 1 including establishing a reference image level proportional to the analog signals (26) representing a non-moisture (20) condition of the exterior surface (22) of the glass (14), scanning each of the analog signals (26) and producing a wiper signal (30) in response to a deviation from the references image level.

8. A method as set forth in claim 7 including changing the reference image level in response to permanent changes in the non-moisture (20) condition of the exterior surface (22) of the glass (14).

9. A method as set forth in claim 1 including positioning a light source (32) adjacent to the interior surface (18) of the sheet of glass (14), directing light from the source to the exterior surface (22) of the glass (14), and wherein the step of passing of light waves is further defined as passing light waves generated by the light source (32) to produce the second image.

10. An assembly as set forth in claim 1 wherein said focal plane detector (12) comprises a plurality of pixels (24) for dividing the images into a plurality of elements and for producing an analog signal (26) corresponding to each of the elements.

11. An assembly for sensing moisture (20) on a glass (14) surface from a position adjacent the glass (14), said assembly comprising;

a focal plane detector (12) adapted for disposition adjacent to the interior surface (18) of the sheet of glass (14), and said focal plane detector (12) including a plurality of elements (24) for producing an analog signal (26) corresponding to each of the elements, an imaging lens (16) adapted for disposition between said focal plane detector (12) and the interior surface (18) of the sheet of glass (14) for directing light waves from moisture (20) on the exterior surface (22) of the sheet of glass (14) through said imaging lens (16) to produce successive first and second images of the moisture (20) on said focal plane detector (12), said assembly characterized by a controller (28) for storing the signals (26) from the elements (24) for the first image and for storing the signals (26) from the elements (24) for the second image and for comparing the signal from each element for the first image to the signal from that element for the second image, and for providing a control signal (30) in response to predetermined differences between the signals (26) from the elements (24) for the first and second images.

12. An assembly as set forth in claim 11 wherein said controller (28) includes an edge detector (40) for detecting the edges in the first and second images and algebraically summing the areas of the first and second images.

13. An assembly as set forth in claim 12 wherein said controller (28) includes amass detector (42) for determining the centers of mass of the second image.

14. An assembly as set forth in claim 13 wherein said controller(28) includes an adjustor (44) for adjusting the contrast and brightness of the first and second images prior to detecting the edges.

15. An assembly as set forth in claim 14 wherein said controller (28) includes a storage parcel (46) for establishing a reference image level of the analog signals (26) representing a non-moisture (20) condition of the exterior surface (22) of the glass (14), for scanning the analog signals (26), for producing a wiper signal (30) in response to a deviation from the reference image level, and for changing the reference image level in response to permanent changes in the non-moisture (20) condition of the exterior surface (22) of the glass (14).

16. An assembly as set forth in claim 11 wherein said controller (28) includes an edge detector (40) for detecting the edges in the first and second images.

* * * * *